(12) United States Patent
Moore

(10) Patent No.: US 6,829,536 B2
(45) Date of Patent: Dec. 7, 2004

(54) SYSTEM AND METHOD FOR PROCESSING WEATHER INFORMATION

(75) Inventor: John S. Moore, Middleton, WI (US)

(73) Assignee: Weather Central, Inc., Madison, WI (US)

(*) Notice: Subject to any disclaimer, the term of this patent is extended or adjusted under 35 U.S.C. 154(b) by 0 days.

(21) Appl. No.: 09/952,409

(22) Filed: Sep. 12, 2001

(65) Prior Publication Data

US 2003/0050757 A1 Mar. 13, 2003

(51) Int. Cl.[7] .......................... G06F 19/00; G01W 1/00
(52) U.S. Cl. ...................................... 702/3; 73/170.16
(58) Field of Search .......................... 702/3; 73/170.16

(56) References Cited

U.S. PATENT DOCUMENTS

| | | | |
|---|---|---|---|
| 4,347,618 A | | 8/1982 | Kavouras et al. |
| 4,402,672 A | | 9/1983 | Lowe, Jr. |
| 4,422,037 A | | 12/1983 | Coleman |
| 4,506,211 A | | 3/1985 | Coleman |
| 4,521,857 A | | 6/1985 | Reynolds, III |
| 5,111,400 A | | 5/1992 | Yoder |
| 5,121,430 A | | 6/1992 | Ganzer et al. |
| 5,255,190 A | * | 10/1993 | Sznaider ........................ 702/3 |
| 5,339,085 A | * | 8/1994 | Katoh et al. ................. 342/180 |
| 5,379,215 A | * | 1/1995 | Kruhoeffer et al. ............ 702/3 |
| 5,517,193 A | | 5/1996 | Allison et al. |
| 5,568,385 A | | 10/1996 | Shelton |
| 5,583,972 A | | 12/1996 | Miller |
| 5,717,589 A | * | 2/1998 | Thompson et al. ............ 702/3 |
| 5,742,297 A | | 4/1998 | Logan |
| 5,839,089 A | | 11/1998 | Yasuda et al. |
| 5,848,378 A | | 12/1998 | Shelton et al. |
| 5,999,882 A | | 12/1999 | Simpson et al. |
| 6,018,699 A | | 1/2000 | Baron, Sr. et al. |
| 6,125,328 A | * | 9/2000 | Baron et al. ................... 702/3 |
| 6,188,960 B1 | | 2/2001 | Baron et al. |
| 6,275,774 B1 | * | 8/2001 | Baron et al. ................... 702/3 |
| 6,278,947 B1 | | 8/2001 | Baron et al. |
| 6,339,747 B1 | * | 1/2002 | Daly et al. ..................... 702/3 |
| 6,400,313 B1 | * | 6/2002 | Morici et al. ............... 342/176 |

OTHER PUBLICATIONS

"Coordinate Transformation Tool: Parameters", www.spenvis.oma.be, May 1998.*
Baron Services, Inc., FasTrac 9 & 24 Operations Manual, Version 2.0, Revision 3, Dec. 13, 1995, Huntsville, Alabama.
Baron Services, Inc., NexTrac NexRad Radar Display and Storm Tracking, Sep. 1996, Huntsville, Alabama.
Kavouras, Inc., NEXRAD AutoTrack Overview, 1995, Burnsville, Minnesota.
Kavouras, Inc., On The Front, vol. 6, No. 4, Jul., 1996, Burnsville, Minnesota.
UNISYS Corporation, Sky Vision, Jan., 1994, Kennett Square, Pennsylvania.
UNISYS, Sky Vision Product Update, Release 2.0, Jun., 1994, Kennett Square, Pennsylvania.
UNISYS, Sky View 95, Jun., 1995, Kennett Square, Pennsylvania.

(List continued on next page.)

Primary Examiner—John Barlow
Assistant Examiner—Toan M. Le
(74) Attorney, Agent, or Firm—Reinhart Boerner Van Deuren S.C.

(57) ABSTRACT

Weather information provided to a system for processing is converted from a weather information source coordinate system to a three-dimensional XYZ coordinate system. Processing of the weather information, e.g., to determine a current location and predicted path of weather phenomena, and to determine geographic locations which are or may be affected by the weather phenomena, is accomplished in the three-dimensional XYZ coordinate system. Locations in the three-dimensional XYZ coordinate system may be converted to two-dimensional screen xy coordinates for the display of weather phenomena indications over a geographic map display without converting the weather phenomena locations to a latitude/longitude coordinate system.

38 Claims, 7 Drawing Sheets

OTHER PUBLICATIONS

UNISYS Weather Information Services, Sky View 95 User's Manual, Version 3.0, 1996, Kennett Square, Pennsylvania.

UNISYS Corporation, Sky Vision 3.1 User's Manual, 1996, Kennett Square, Pennsylvania.

UNISYS Weather Information Services, pcPUP —Update, Jun. 20, 1995, Kennett Square, Pennsylvania.

UNISYS Weather Information Services, WeatherMAX Site and Product Catalog, Version 1.09, Aug. 28, 1995, Kennett Square, Pennsylvania.

UNISYS Weather Information Services, Weather MAX Site and Product Catalog, Version 3.00, Dec. 5, 1997, Kennett Square, Pennsylvania.

FCW Media Group, Weather on Demand, FCW.COM, Federal Computer Week, Off the Shelf, Jan. 8, 1996.

Affidavit of Steven L. Anderson (including Exhibits B, C, E, F, G, H, I, J, K, L, N, and O), Nov. 22, 2002.

McGraw–Hill Book Company, David F. Rogers and J. Alan Adams, Mathematical Elements for Computer Graphics, pp. 54–55, 1976, New York, U.S.A.

Baron Services, Inc., FasTrac/NexTrac Operations Manual, Version 2.0, pp. 39–47, Jun. 1997, Huntsville, Alabama.

* cited by examiner

SYSTEM AND METHOD FOR PROCESSING WEATHER INFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention pertains generally systems and methods for displaying representations of weather phenomenon over maps of geographic locations for televised weather presentations, and the like, and computer based systems and methods for preparing and manipulating such displays including systems and methods for tracking and displaying the expected future path of such weather phenomena.

BACKGROUND OF THE INVENTION

Various systems and methods are used for providing viewers of broadcast and cable television weather presentations with informative and accurate weather information. Typically, such systems provide a display of weather phenomena, e.g. clouds, rain, storms, etc., overlaid on a map of a geographical area of interest. Such displays were originally created by drawing representations of weather phenomena, or placing pre-made weather symbols, on a physical map of an area of interest. The image of the map was then broadcast to viewers, usually with a weather presenter positioned in front of the map to provide an explanation of the map display. Computer systems are now employed to facilitate the generation of weather displays, using computer generated graphics with animation.

A typical computer-implemented system for preparing a weather presentation will include detailed digital maps of geographic areas of interest stored for access by the computer. Weather information, such as satellite imagery and/or weather radar information, such as NEXRAD weather radar information provided by the government and live local weather radar data, is provided to the system. The system processes the weather information to generate a display, e.g., of the current position of weather phenomena, such as a storm cell, and, e.g., of the projected path of the weather phenomena over a future period of time. A graphical display and/or representation of the current position, and projected future path, of the weather phenomena is then overlaid on the digital maps to create a digital display of current and predicted weather for a particular area of interest. Other information provided on the weather display may include a display of the characteristics of the weather phenomena displayed, e.g., whether a storm cell contains elements of hail or tornadoes, as well as a graphical and/or textual display of when a particular weather condition is expected to reach a particular location.

The ability to combine weather information from various weather information sources with geographical data to determine, e.g., the current position of weather phenomena and predicted path of such phenomena with respect to geographic locations of interest, and then to generate a combined weather/geographical display in an accurate and informative manner, can provide a challenge in that weather information sources, geographical databases, and screen displays employ various different coordinate systems to identify the positions of weather phenomena, geographical locations, and display positions within their respective areas. For example, weather radar systems may provide information on the current position of weather phenomena, e.g., a storm being tracked by the weather radar, as an angular direction of the storm from the radar source (azimuth) and distance of the storm from the radar source (range). An example of such a weather radar system is the NEXRAD radar service, which provides such storm attribute position information in degrees and nautical miles, along with detailed information on the contents of the storm, as well as a forecast movement angle (storm path) in degrees and forecast movement speed in nautical miles per hour. Conventional commercially available geographic databases typically provide location information for places included in the database in conventional latitude/longitude (lat/lon) coordinates. In order to combine the NEXRAD weather radar information with the geographical database information, e.g., to determine which places identified in the geographical database are currently affected by, or are in the predicted path of, a storm identified in the NEXRAD information, the storm location information provided by NEXRAD in range and azimuth and the geographical information provided in the geographical database in lat/lon must be converted to a common coordinate system. In conventional computer-implemented systems for preparing weather presentations, this is achieved by converting the location of a storm or other weather phenomena identified by range and azimuth in the NEXRAD, or other radar, data to lat/lon coordinates, in a conventional manner, such that the position of the storm or other weather phenomena, and predicted path of movement thereof, may be compared easily to places identified by lat/lon coordinates in the geographical database, to determine which places are currently, or in the future are likely to be, affected by the storm or other weather phenomena. The storm location/predicted path of movement in lat/lon may then be combined with the geographical/map database in lat/lon coordinates to generate a graphical display of the weather phenomena overlaid on a graphical map display by converting the lat/lon coordinates of the weather phenomena and geographic data into two-dimensional screen coordinates in a conventional manner.

Although conceptually straightforward, the conventional method of converting weather radar information provided in azimuth and range from a known radar site location to lat/lon coordinates is considerably limited and inflexible. The conversion to two-dimensional lat/lon coordinates does not take into account any altitude information, i.e., neither altitude above/below sea level nor altitude above the Earth's surface, of weather phenomena information which may be provided by or extracted from a weather radar or other weather information source. Thus, valuable information may be lost in the conversion of weather information to lat/lon coordinates which do not take into account weather phenomena altitude or variations in altitude of the Earth's topology. Furthermore, although it may be convenient to convert the range and azimuth of a storm location from a given fixed NEXRAD or other radar location, for which the lat/lon coordinates are known, to lat/lon coordinates, such a conversion may not be as convenient for weather phenomena information provided from current or future weather information sources which do not provide weather information in such a manner, e.g., satellite based weather observation systems. Thus, such a conversion to lat/lon coordinates may not be effective or useful when it is desired to combine weather information from a variety of different weather information sources to generate a weather presentation and display.

What is desired, therefore, is a system and method for processing weather information in which weather information from one or more weather information sources is converted into a universal three-dimensional coordinate system. Preferably, the current location of weather phenomena may be converted into the universal three-dimensional coordinate system from weather information provided by one or more weather information sources, and a predicted path of movement of such weather phenomena may be generated in the three-dimensional coordinate system. Preferably, locations of selected places of interest may be provided in, or converted to, the three-dimensional coordinate system for comparison with the weather phenomena position and predicted path of movement information in the three-dimensional coordinate system, to determine if the selected places of interest are currently affected by, or are in the predicted path of, the weather phenomena. The position of weather phenomena, and predicted path thereof, in the three-dimensional coordinate system may preferably be converted to two-dimensional screen display coordinates for display, e.g., as a graphical representation of the current position and predicted path of weather phenomena overlaid on a geographical map display, showing areas currently affected by, or predicted to be affected by, the weather phenomena.

SUMMARY OF THE INVENTION

The present invention provides a system and method for processing weather information in which weather information from one or more weather information sources is converted into a universal three-dimensional XYZ space coordinate system centered at the center of the Earth. The current location of detected weather phenomena, based on weather information provided from the one or more weather information sources, may be converted into the three-dimensional XYZ coordinate system, and a predicted future path of the weather phenomena derived therefrom in the XYZ coordinate system. Geographical database information, including the locations of places of interest which are either provided in, or converted to, the universal three-dimensional XYZ coordinate system, may be combined with the current location and predicted path of movement of the weather phenomena in the XYZ coordinate system to determine which places of interest are currently, or are likely to be, effected by the weather phenomena. The location and predicted path of weather phenomena in the XYZ coordinate system may be converted to a two-dimensional xy screen coordinate system for display on a display screen in combination with a geographical map display of a graphical representation of the current position and path of the weather phenomena overlaid on the geographical map display. Such a combined weather/geographical map display may include an indication of places of interest which are currently affected by the displayed weather phenomena, or are in the predicted path of the weather phenomena.

A system for processing weather information in accordance with the present invention may be implemented in software on a conventional commercially available computer processor or system. The system may receive weather information from various sources, such as NEXRAD or other weather radar information, and other weather information from other weather information sources. Weather information received by the system is converted by the system to the universal three-dimensional XYZ coordinate system using coordinate conversion routines stored in memory associated with the system. The system preferably determines the current location and a predicted path of the weather phenomena in the three-dimensional XYZ coordinate system. The system may preferably combine the weather phenomena location, and predicted path thereof, in the XYZ coordinate system, with geographic location information to determine locations of interest which are currently, or in the future are likely to be, affected by the weather phenomena. The system may also produce a graphical weather display, including a graphical representation of the weather phenomena overlaid on a map of a geographical area of interest, showing, e.g., the current location of the weather phenomena and an indication of the future path of the weather phenomena, along with an indication of selected places of interest in the geographical area displayed which are in the predicted path of the weather phenomena. Such a weather display may, for example, be saved or broadcast live as part of a live television weather presentation.

Weather information provided to a system for processing weather information in accordance with the present invention may be provided from a NEXRAD weather radar system. NEXRAD provides storm attribute information which includes the current location of a storm identified by the direction of the storm in degrees from the radar source (azimuth) and the distance of the storm in nautical miles from the radar source (range). The geographic location of the radar source in latitude and longitude (lat/lon) is known. In accordance with the present invention, the storm location in azimuth and range from the radar site is converted into three-dimensional coordinates in an XYZ space defined on the center of the Earth. For example, the XYZ coordinate 0,0,0 may be defined at the center of the Earth, with the y-axis defined by the line extending from the center of the Earth to the North Pole, the x-axis defined by the line extending from the center of the Earth to the Equator at longitude 0, and the z-axis defined by the line extending from the center of the Earth to the Equator at longitude −90 (90 degrees West).

In accordance with the present invention, the location of a storm in the three-dimensional XYZ coordinate system may be derived from the location of the storm as provided in the NEXRAD storm attribute information by a two "rotation" process in which the XYZ coordinate of the known location of the NEXRAD radar site is shifted first by the distance of the storm from the radar site (range) as provided in the NEXRAD storm attributes, and then by the direction (azimuth) of the storm from the radar site as provided in the NEXRAD storm attributes, to generate a new point in XYZ space which corresponds to the location of the storm as provided by the NEXRAD storm attributes. This conversion procedure may begin, for example, by first determining the position of the fixed NEXRAD radar site in the universal three-dimensional XYZ coordinate system. This is accomplished by a straightforward conversion of the known location of the NEXRAD site in lat/lon into an XYZ coordinate in the three-dimensional XYZ coordinate system. The original XYZ position of the radar site is shifted in the three-dimensional XYZ space by "rotating" the original position by an amount corresponding to the distance from the radar site to the storm location as provided in the NEXRAD storm attributes, along a rotation axis defined by a cross product of the vector extending from the center of the Earth to the north pole and a vector extending from the center of the Earth to the radar site XYZ location in the three-dimensional XYZ space. The resulting first rotation shifts the original XYZ location due north by an amount corresponding to the distance (range) value provided in the NEXRAD storm attributes, generating a position due north of the radar site location. In the second "rotation," the position obtained in the first rotation is rotated around the vector extending from the center of the Earth to the original XYZ position of the NEXRAD radar site by the azimuth angle provided in the NEXRAD storm attributes. This second rotation results in the XYZ coordinates of the storm location in a universal three-dimensional XYZ coordinate system in accordance with the present invention.

Once the location of a storm being detected and tracked by NEXRAD is converted into the three-dimensional XYZ coordinate system, a predicted future path of movement of the storm may be derived in the three-dimensional XYZ coordinate system, e.g., using the forecasted movement direction and speed information provided in the NEXRAD storm attributes, or in another manner. The NEXRAD location and predicted path may then be compared in the three-dimensional XYZ coordinate space with selected geographic locations, e.g., provided in a geographic location database, to determine which selected locations are in the path of the storm. If the selected locations are provided in lat/lon coordinates in a conventional geographic database, the comparison between the selected locations and the NEXRAD storm location and path in the three-dimensional XYZ coordinate system may require first converting the selected locations from lat/lon coordinates to XYZ coordinates. Other processing of the NEXRAD or other weather information in the XYZ coordinate system may also be performed.

A graphical weather display of a weather phenomena location, path, and affected locations, derived, in accordance with the present invention, in three-dimensional XYZ coordinate space, may be displayed, e.g., as graphical representations of the weather location and predicted path overlaid on a geographic map of an area of interest. To generate such a display, the weather location and path in the three-dimensional XYZ coordinate system must be converted into two-dimensional xy screen coordinates for display. This may be accomplished without converting the weather location or path information to intermediate lat/lon coordinates by employing a search routine to determine the two-dimensional screen xy coordinates which correspond to the three-dimensional XYZ coordinates of a storm, storm path, or other weather phenomena. For example, to determine the screen y-coordinate, the screen y-coordinates for latitude 90 and −90 are calculated. A screen y-coordinate to be tested is then selected. The location of the selected screen y-coordinate in three-dimensional XYZ space is then computed. The Y component of the point to be plotted and the Y component of the screen y-coordinate being tested are then compared. The selected screen y-coordinate is then adjusted by the results of the comparison. This procedure is repeated until the Y-coordinates of the three-dimensional XYZ points to be plotted and the screen y-coordinate tested are equal. A similar binary search routine may be performed to determine the screen x-coordinate of a point in three-dimensional XYZ space to be displayed on the screen display.

Further objects, features, and advantages of the invention will be apparent from the following detailed description, taken in conjunction with accompanying drawings.

DETAILED DESCRIPTION OF THE INVENTION

The present invention provides a system and method for processing weather information provided from one or more weather information sources. The weather information provided from the one or more weather information sources is converted into a three-dimensional XYZ space coordinate system. The weather information is processed in the three-dimensional XYZ space coordinate system, e.g., to generate a current location and predicted path of movement of weather phenomena defined in the weather information, to compare the weather phenomena location and path information to locations in a geographic database to determine which locations are affected by the weather phenomena defined in the weather information, etc. The weather information thus processed in the three-dimensional XYZ space coordinate system may be converted to two-dimensional screen coordinates, e.g., for the generation of a weather display of the weather information overlaid on a geographical map of an area of interest.

Figure 1:
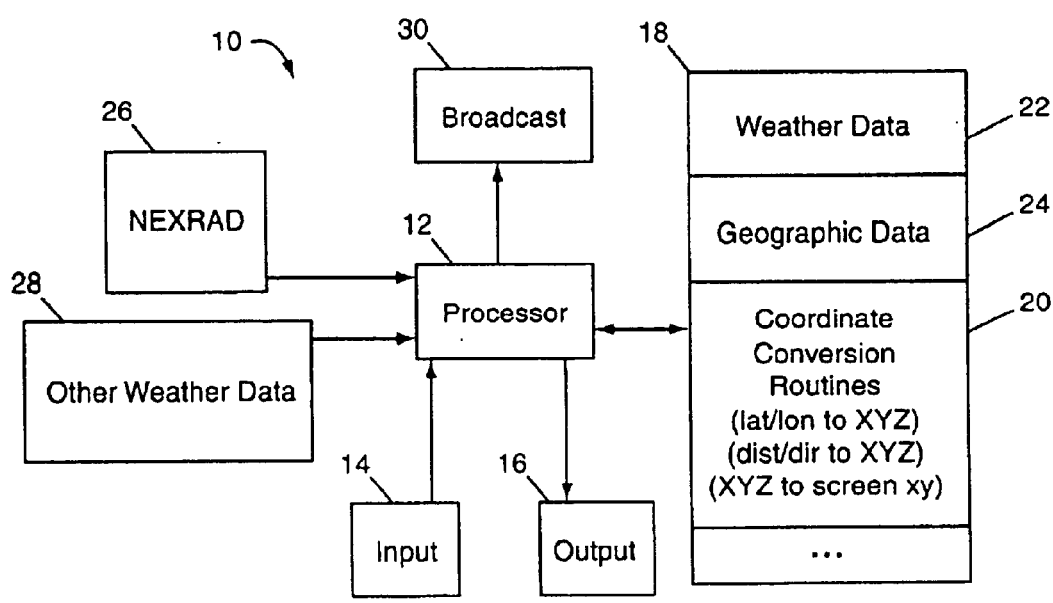
FIG. 1 is a schematic block diagram of a system for processing and displaying weather information in accordance with the present invention.

An exemplary system 10 for processing weather information in accordance with the present invention is illustrated in FIG. 1. A system 10 for processing weather information in accordance with the present invention is preferably a computer-implemented system. The system 10 may be implemented using any conventional modern computer processor 12. A processor 12 which has sufficient operating speed to manipulate large amounts of graphical and other data is preferred.

Processor 12 preferably includes conventional operator input 14 and display 16 devices associated therewith. The operator input devices 14 may include, for example, a conventional computer keyboard, mouse, trackball, etc. A conventional operator display device 16 capable of displaying high quality graphics may be employed.

The processor 12 is also provided with conventional computer memory 18. The memory 18 may be implemented in any conventional manner, and may include both RAM memory and disk or other mass memory storage devices.

Memory 18 is employed in a conventional manner to store the software programs executed by the processor 12 and related data necessary to implement a system for processing weather information in accordance with the present invention. As will be discussed in more detail below, such software programs include software programs 20 for converting weather information to a universal three-dimensional XYZ space coordinate system and for converting weather information in the universal three-dimensional XYZ space coordinate system to two-dimensional screen xy coordinates for the display of such information. Weather data information 22 received from one or more weather information sources, as well as digital geographic map information 24, may also be stored in memory 18, in a conventional manner for use by the processor 12. The geographic map data 24 stored in memory preferably includes high resolution digital maps for generating weather displays. Any commercially available high quality map data set may be employed. Most such commercially available digital maps sets include information for the entire country. Such digital map data is preferably vector-based, and preferably includes locations such as state borders, county borders, interstates, highways, roads, city streets, metropolitan areas, etc. Such locations are typically identified within the map data set by latitude and longitude (lat/lon) coordinates. Other programs and data for the general operations of the processor 12 may also, of course, be stored in memory 18.

Processor 12 is preferably adapted to receive weather information from a variety of sources. Such weather information may include NEXRAD weather radar information 26 provided by the government. Weather information provided by NEXRAD 26 includes storm attribute information which defines storm cells and provides detailed information concerning the cells, including characteristics of the cells (e.g., hail and vortex intensity and location, rainfall intensity, speed, etc.), as well as the position, and direction and speed of movement of the cells. NEXRAD attributes provide the position of a storm cell as a direction of the storm in degrees from the radar source (azimuth) and a distance of the storm in nautical miles from the radar source (range). The location, in lat/lon, of the NEXRAD radar source is known. Speed and direction of movement of storm cells is provided in the NEXRAD attribute data as a forecasted movement angle (storm path) in degrees and a forecasted movement speed in nautical miles per hour. Other sources 28 of weather information which may be provided to the system processor 12 include local live weather radar data, satellite imagery, national weather service weather wire storm warning information, weather information provided by automated weather stations, etc. Weather information may also be provided manually to the system processor 12, e.g., via the user input device 14.

A system 10 for processing weather information in accordance with the present invention preferably provides the operator of the system with various tools, implemented in a graphical user interface, e.g., as presented on the user output device 16, for preparing a high quality weather display for broadcast, i.e., over the air, via cable, etc., to viewers, and for manipulating the display during the live broadcast. An exemplary graphical user interface which may be employed for preparing a high quality weather display in combination with a system for processing weather information in accordance with the present invention is illustrated and described in U.S. Pat. No. 6,339,747, entitled WEATHER TRACKING AND DISPLAY SYSTEM AND METHOD. The system 10 preferably provides an output of such a weather display to a conventional over-the-air or cable broadcast system 30. Alternatively, or additionally, weather displays prepared using the system 10 may be stored in digital form in memory 18, or in analog form, to tape, etc. for retrieval and playback at a later time.

Figure 2:
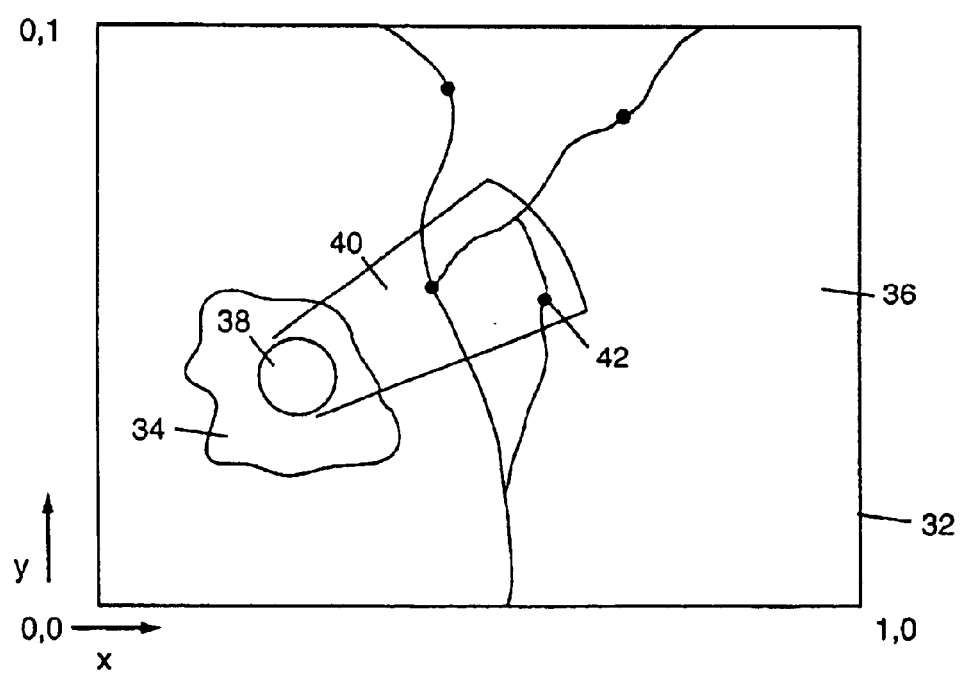
FIG. 2 is an exemplary weather display showing a storm cell and projected movement path thereof as overlaid on a geographical map background as may be generated by a system and method for processing weather information in accordance with the present invention.

An exemplary schematic illustration of a weather display 32 which may be generated by a system 10 in accordance with the present invention is presented in FIG. 2. Typically, such a weather display 32 will include a graphical display of weather phenomena 34, e.g., a storm, overlaid on a graphical map 36 of a geographic area of interest. The weather display 32 may include, e.g., a graphical marker 38 indicating the current location of a storm cell or other weather phenomena, as well as a track display, such as a tracking wedge 40, indicating the speed and direction of the storm cell or other weather phenomena. The marker 38 may be of any shape, for example, the marker 38 may be a cut-out having the characteristics of the weather phenomena being tracked (e.g., the marker 38 may be in the shape of a tornado when tornadic activity is indicated in the displayed storm cell 34). The length of the tracking wedge 40 may indicate the speed of the weather cell, e.g., how far the cell will travel at current speed in, e.g., half an hour or some other time period. The length and width of the tracking wedge 40 may be user selectable. Another track display format, such as an arrow, line, parallel lines, etc., indicating cell speed and/or direction, may also be used. In addition to the graphical display, the weather display 32 may include a textual window (not shown in FIG. 2) which contains a list of cities 42 or other locations of interest in the predicted path of the weather cell 34, and the estimated arrival times of the weather cell 34 at those locations, based on the projected path 40 of the cell. Selected cities 42 in the path 40 of the weather cell 34 may also be highlighted on the map display 32.

In accordance with the present invention, weather information required to generate a weather display 32 is received from one or more weather information sources, 26, 28. The weather information provided from the one or more weather information sources 26, 28 may indicate, for example, the current location and predicted path of movement of weather phenomena in one or more different coordinate systems. Geographical information 24 with which the weather phenomena information is to be combined to provide the weather display 32 may be provided in a different coordinate system from the weather information. In accordance with the present invention, weather information provided from one or more weather information sources is converted into a universal three-dimensional XYZ space coordinate system in which further processing of the weather information may take place, as described in more detail below.

The present invention will now be described in detail with reference to the exemplary processing of NEXRAD weather information, in particular, NEXRAD storm attribute weather information. However, it should be understood that the present invention is also applicable to weather information provided by weather information sources other than NEXRAD, and by weather information sources other than weather radar, and to weather information provided in different coordinate systems than is the weather information provided by the NEXRAD storm attributes.

Figure 3:
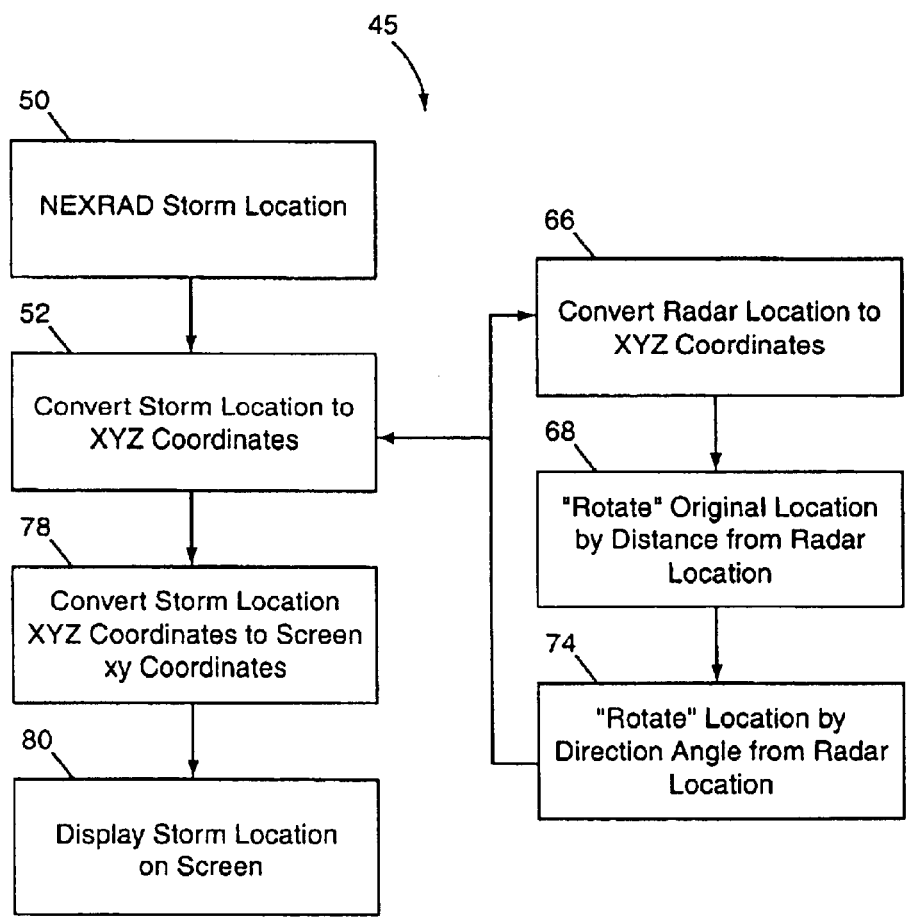
FIG. 3 is a flowchart diagram illustrating a method in accordance with the present invention for converting NEXRAD storm location information into a three-dimensional XYZ coordinate system for processing and for conversion of the XYZ storm location coordinates into two-dimensional screen xy coordinates for display of the storm location on a weather display as illustrated in FIG. 2.
Figure 4:
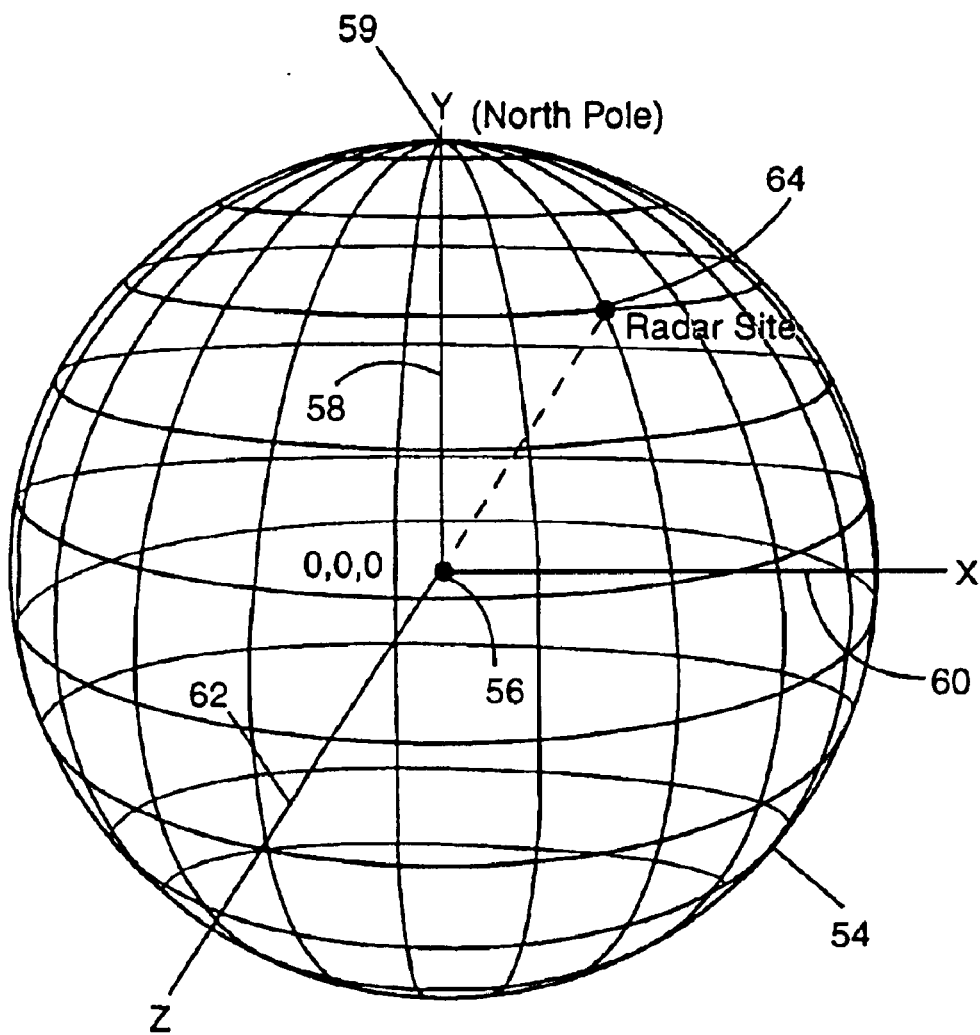
FIG. 4 is a schematic illustration of an exemplary three-dimensional coordinate system centered on the center of the Earth as employed in a system and method for processing weather information in accordance with the present invention.
Figure 5:
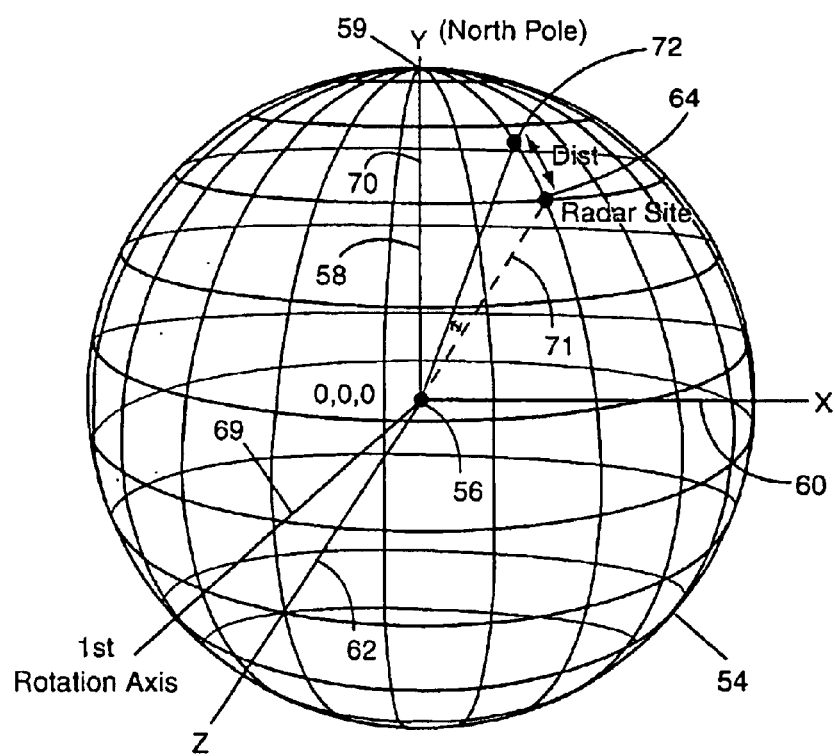
FIGS. 5 and 6 illustrate two sequential steps in an exemplary method for converting the location of a storm defined by a direction and distance from a radar site to a three-dimensional XYZ coordinate in accordance with the present invention.
Figure 6:
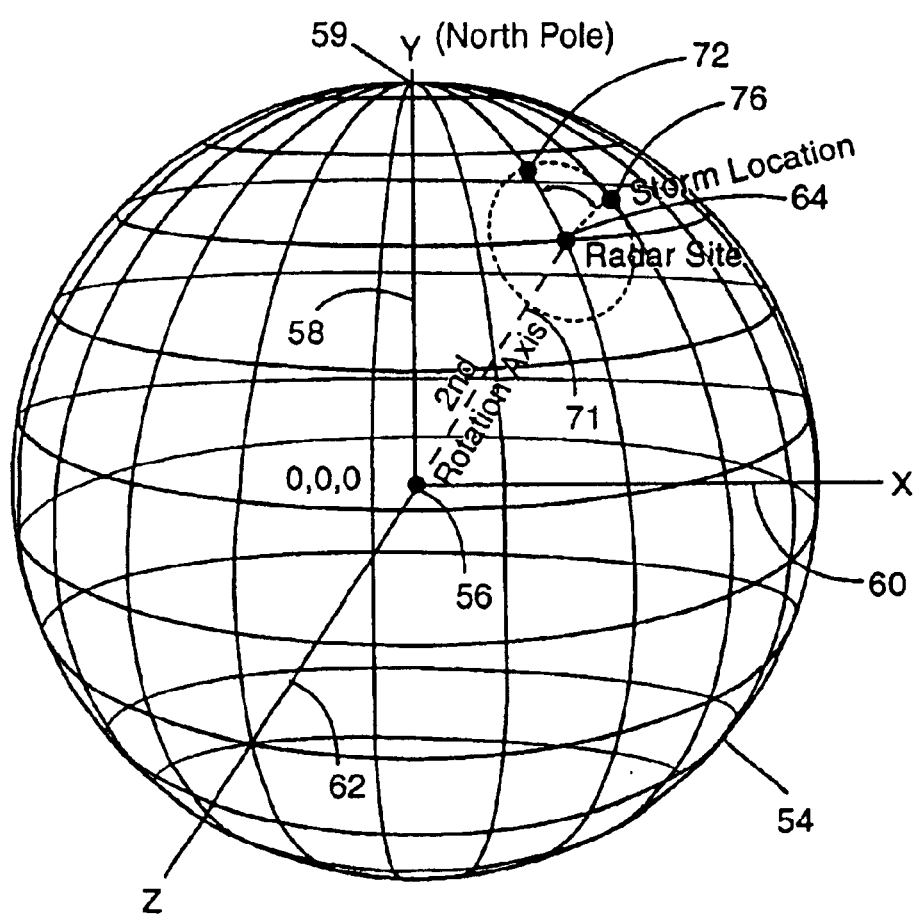

An exemplary method 45 for processing NEXRAD storm attribute weather information in accordance with the present invention will now be described with reference to the flowchart diagram of FIG. 3, and the illustrations of FIGS. 4–6, which follow. Initially, at step 50, the system processor 12 of a system 10 for processing weather information in accordance with the present invention receives NEXRAD storm attribute information from a NEXRAD weather radar source 26. Such weather information 22 may be stored in memory 18. As discussed above, NEXRAD storm attribute information includes tabular data identifying a storm detected and being tracked by a NEXRAD radar system. Such NEXRAD attribute data includes detailed information concerning the characteristics of storm cells, as well as the position, and direction and speed of movement of the cells. The location of storm cells is provided in the NEXRAD attributes as a direction of the storm in degrees from the NEXRAD radar source (azimuth) and distance of the storm in nautical miles from the radar source (range).

In accordance with the present invention, the distance and direction of a storm from a NEXRAD radar source, as identified in the NEXRAD attributes weather information, is converted to a universal three-dimension XYZ space coordinate system at step 52. An exemplary universal three-dimensional coordinate system in accordance with the present invention is illustrated schematically in FIG. 4 with respect to a sphere 54 representing the earth. As illustrated, the XYZ space defined by the three-dimensional coordinate system may have the coordinate 0, 0, 0, at the center 56 of the earth 54. The y-axis 58 of the coordinate system is thus defined as the line extending from the center 56 of the earth 54 through the north pole 59. The x-axis 60 of the coordinate system is defined as the line extending from the center 56 of the earth 54 to the equator at longitude 0. The z-axis 62 of the coordinate system is defined as the line extending from the center of the earth to the equator at longitude minus 90 degrees (i.e., 90 degrees west). Of course, variations of this three-dimensional coordinate system, e.g., with the center of the coordinate system and the x, y, and z axes being defined differently with respect to the earth 54, may also be employed in accordance with the present invention.

An exemplary method for converting the location of a storm cell provided as a distance and direction from a NEXRAD radar site into the coordinate system illustrated in FIG. 4 will now be described in detail. The location of the NEXRAD radar site 64 from which the NEXRAD weather information is provided is known in lat/lon coordinates. At step 66, this known location of the NEXRAD radar site 64 in lat/lon is converted to a three-dimensional XYZ coordinate. An exemplary computer program procedure for accomplishing such a conversion follows, although other similar procedures may also be employed in accordance with the present invention.

```
void latlontoXYZ(double lat, double lon, double alt, double *xyz)
{
    double nfy=EARTH_RADIUS*sin(DEGREES_2_RADS*lat);
    double nfty=cos(DEGREES_2_RADS*lat);
    double nfz=EARTH_RADIUS*sin(DEGREES_2_RADS*lon)*nfty;
    double nfx=EARTH_RADIUS*cos(DEGREES_2_RADS*lon)*nfty;
    double altRatio=1+(alt/EARTH_RADIUS);
    xyz[0]=nfx*altRatio;
    xyz[1]=nfy*altRatio;
    xyz[2]=-nfz*altRatio;
}
EARTH_RADIUS in kilometers
Copyright 2001, Weather Central, Inc.
```

Given the position of the NEXRAD radar site 64 in XYZ coordinates, this original position in three-dimensional XYZ space is then "rotated" by an amount related to the distance from the radar site to the storm location, as indicated in the NEXRAD storm attribute weather information, at step 68. This procedure is illustrated in FIG. 5. The axis 69 of the rotation is defined by the cross product of a vector 70 extending from the center 56 of the earth 54 to the north pole 59 and a vector 71 extending from the center 56 of the earth 54 to the radar site XYZ location 64. This generates a new intermediate point 72 in XYZ coordinates which is the distance from the original radar site position 64 as defined by the NEXRAD storm attribute distance information, but which is positioned due north (direction equals 0) of the radar site location 64.

In the next step 74, the new intermediate location 72 resulting from the first rotation in three-dimensional XYZ space is "rotated" around an axis defined by the line 71 extending from the center 56 of the earth 54 to the original radar site position 64 by the angle (azimuth) provided in the NEXRAD storm attribute weather information. This operation is illustrated in FIG. 6. The XYZ location 76 resuliting from the second "rotation" is the location of the storm as identified in the NEXRAD storm attribute information as converted to the three-dimensional XYZ coordinate system.

An exemplary computer program for implementing the double "rotation" procedure described to determine the location of a NEXRAD defined storm in the exemplary three-dimensional XYZ coordinate system being described follows. Other similar procedures may also be employed in accordance with the present invention.

```
/ getting new position from distance and Direction from existing XYZ
#define NM_EARTH_RADIUS (6371200.0/1852.0)
// XYZ-space refers to earth location based on a 3 dimensional coordinate
// system which has 0,0,0 as the center of the earth. the y-axis being the
// line from the center of the earth to the North Pole, the x-axis being
// the line from the center of the earth to the Equator at longitude 0, and
// the z-axis being the line from the center of the earth to the Equator at
// longitude -90.
void distDirXYZ(double* srcXYZ, double dist, double dir, double* dstXYZ)
{
    // srcXYZ—original position (radar site) in xyz space.
    // dist—distance from original position in nautical miles
    // dir—dir to go from original position (0=due north)
    // dstXYZ—returned new position
    double nXYZ[3]; // temperary point to hold result of first rotation
    double center[3]={0, 0, 0}; // center of the earch
    double pole[3]={0, EARTH_RADIUS, 0}; // north pole vector
    double vec[3]; // first rotation axis
    double angle; // first rotation angle
    // Rotate the srcXYZ point by the angle created by the dist around the axis computed
    // by doing the cross product of the following vectors:
    // a. from center of earth to North Pole
    // b. from center of earth to xyz point
```

```
// This generates the position where the direction is 0
    // this computes arc angle in radians angle=dist/NM_
       EARTH_RADIUS;
    // compute cross product of the following lines:
    // a. from center of earth to North Pole
    // b. from center of earth to xyz point
    // This creates the rotation axis crossProduct(srcXYZ,
       center, pole, vec); // this creates
    // now do the rotation to create the 0 direction position
       rotateXYZ(vec, srcXYZ, angle, nXYZ);
// Rotate the due north position around the line created from
   the center of
// the earth to the original position, by the direction specified
   in the call (this
// computes point desired).
    rotateXYZ(srcXYZ, nXYZ, DEGREES_2_RADS*
       (360-dir), dstXYZ);
    return;
}
void rotateXYZ(double*axis, double*point, double angle,
   double* newPoint)
{
// axis—rotation axis
// point—point to be rotated about the axis
// angle—angle to rotate the point
// newPoint—returned new point
double dist, cos x, cos y, cos z, sin A, cos A;
double tpnt[3];
double pole[3]={0, 6371.2, 0};
double mat[16];
dist=sqrt(axis[0]*axis[0]+axis[1]*axis[1]+axis[2]*axis[2]);
cos x=axis[0]/dist;
cos y=axis[1]/dist;
cos z=axis[2]/dist;
cos A=cos(angle);
sin A=sin(angle);
mat[0]=cos x*cos x+(1-cos x*cos x)*cos A;
mat[1]=cos x*cos y*(1-cos A)+cos z*sin A;
mat[2]=cos x*cos z*(1-cos A)-cos y*sin A;
mat[3]=0;
mat[4]=cos x*cos y*(1-cos A)-cos z*sin A;
mat[5]=cos y*cos y+(1-cos y*cos y)*cos A;
mat[6]=cos y*cos z*(1-cos A)+cos x*sin A;
mat[7]=0;
mat[8]=cos x*cos z*(1-cos A)+cos y*sin A;
mat[9]=cos y*cos z*(1-cos A)-cos x*sin A;
mat[10]=cos z*cos z+(1-cos z*cos z)*cos A;
mat[11]=0;
mat[12]=0;
mat[13]=0;
mat[14]=0;
mat[15]=1;
newPoint[0]=(point [0]*mat [0])+(point [1]*mat [4])+(point
   [2]*mat [8]);
newPoint[1]=(point [0]*mat [1])+(point [1]*mat [5])+(point
   [2]*mat [9]);
newPoint[2]=(point [0]*mat [2])+(point [1]*mat [6])+(point
   [2]*mat [10]);
}
Copyright 2001, Weather Central, Inc.
```

Having converted the storm location to the three-dimensional XYZ coordinate system at step 52, the weather information, now in the three-dimensional coordinate system, may be processed in a variety of ways, as described in more detail below. To display the processed weather information, it may be desirable or necessary to convert the storm location in the XYZ coordinate system to a two-dimensional screen xy coordinate for, e.g., the display of a marker or other indication of the storm location overlaid on a geographical map display provided on the screen. This may be accomplished without converting the storm location from the three-dimensional XYZ coordinate system into a conventional lat/lon coordinate system by, e.g., employing a binary search routine to determine the appropriate location on the screen for the XYZ point to be plotted. The x and y screen coordinates for the storm location point to be plotted may be determined separately in this manner. (In the following example, the screen x-axis is defined as the horizontal screen axis and the screen y-axis is defined as the vertical screen axis, see FIG. 2.) For example, to calculate the screen y coordinate corresponding to the location of a storm in the three-dimensional XYZ coordinate system, the screen y coordinates for latitude 90 and −90 of a geographical map area to be displayed on the screen are first calculated. A screen y coordinate to be tested (e.g., the y coordinate for the center of the screen along the y-axis) is then selected. The lat/lon coordinate of the map position corresponding to the selected screen y coordinate is known. From this lat/lon of the selected screen y coordinate, the corresponding XYZ coordinate in three-dimensional space of the screen y coordinate being tested is determined. (E.g., using the routine described above for converting a lat/lon coordinate to a three-dimensional XYZ coordinate.) The Y component of a storm location or other point to be plotted and the Y component of the screen y position being tested are then compared. The current selected screen y coordinate being tested is adjusted by the results of the comparison. For example, depending upon a value of the difference between the Y component of the point to be plotted and the Y component of the screen y coordinate being tested, a new y value point in the middle of an upper or lower half of the range of screen coordinates being considered may be selected. The described procedure is then repeated with the new selected screen y coordinate until the Y coordinate of the XYZ point to be plotted and the Y coordinate of the screen y are substantially equal (e.g., differ by less than a selected amount, e.g., 0.001 kilometers). A similar procedure may be employed to derive the screen x coordinate of a three-dimensional XYZ storm location or other point to be plotted on the screen.

An exemplary computer program procedure for implementing the binary search routine described above for plotting a storm location or other coordinate from three-dimensional XYZ space onto a two-dimensional screen display of a geographic area, without converting the storm location or other point to be plotted to lat/lon coordinates, is provided below. Other similar procedures may also be employed in accordance with the present invention.

```
// This routine calculates the screen coordinates of an xyz
   point.
// The visible portion of the screen is
// upper left: 0,1
// lower right: 1,0;
// The returned value can be outside this visible range
// The screen is assumed to be a psuedo mecator projection.
// ::latlontoXYZ(lat, lon, 0, cxyz); is a function that given a
   lat/lon/altitude
```

```
// returns the xyz point
void xyzToScreen(Latlon ul, Latlon lr, double*xyz,
    double*x, double*y)
{
// ul—the lat/lon of the upper left screen position
// lr—the lat/lon of the lower right screen position
// xyz—the xyz position for which a screen coordinate is
    desired
// x—the returned screen X coordinate
// y—the returned screen Y coordinate
    double yhi, ylo, cy, diff;
    double xhi, xlo, cx, mult;
    double cxyz[3], lat, lon, llon, hlon;
// calculate the y coordinate
    // first calculate the screen Y coordinates for lat 90 and
    -90.
yhi=1+(90-ul.lat)/(ul.lat-lr.lat);
ylo=-(lr.lat+90)/(ul.lat-lr.lat);
    // do a binary search for the screen coordinate by:
    // computing the xyz of the current screen y being tested
    // comparing the xyz y components
    // adjusting the current screen y by the results of the
        compare
    // if the two xyz y components are equal, then done
do {
    cy=(yhi-ylo)/2+ylo;
    lat=cy*(ul.lat-lr.lat)+lr.lat;
    ::latlontoXYZ(lat, lr.lon-ul.lon, 0, cxyz);
    diff=cxyz[1]-xyz[1];
    if (diff<0) {
        ylo=cy;
        diff=-diff;
    } else if (diff>0) yhi=cy;
} while (diff>0.001);
*y=Cy;
// determine the screen x coordinate
    // first determine which quadrant the xyz point is in
if ((xyz[0]<0) && (xyz[2]>=0)) {
    llon=-180;
    hlon=-90;
    mult=-1;
    // -180- -90
} else if ((xyz[0]<0) && (xyz[2]<0)) {
    llon=90;
    hlon=180;
    mult=1;
    // 90-180
} else if ((xyz[0]>=0) && (xyz[2]>=0)) {
    llon=-90;
    hlon=0;
    mult=-1;
    // -90-0
} else if ((xyz[0]>=0) && (xyz[2]<0)) {
    llon=0:
    hlon=90;
    mult=1;
    // 0-90
}
    // calculate the screen x coordinates for the quadrants
        extents
xhi=1+(hlon-lr.lon)/(lr.lon-ul.lon);
xlo=-(ul.lon-llon)/(lr.lon-ul.lon);
    // do a binary search for the screen x coordinate by:
    // computing the xyz of the current screen x being tested
    // comparing the xyz x components
    // adjusting the current screen x by the results of the
        compare
    // if the two xyz x components are equal, then done
do {
    cx=(xhi-xlo)/230 xlo;
    Ion=cx*(lr.lon-ul.lon)+ul.lon;
    ::latlontoXYZ(APP_PTR->script( ), lat, lon, 0, cxyz);
    diff=mult*(cxyz[0]-xyz[0]);
    if (diff>0) {
        xlo=cx;
    } else if (diff<0) {
        xhi=cx;
        diff=-diff;
    }
} while (diff>0.001);
*x=cx;
}
```

Having converted a storm location from the XYZ coordinate system to two-dimensional screen xy coordinates in the manner described, the storm location may be displayed at step 80, e.g., as a marker 38 or other information overlaid on a geographic map 36 at the calculated display screen xy coordinates.

Figure 7:
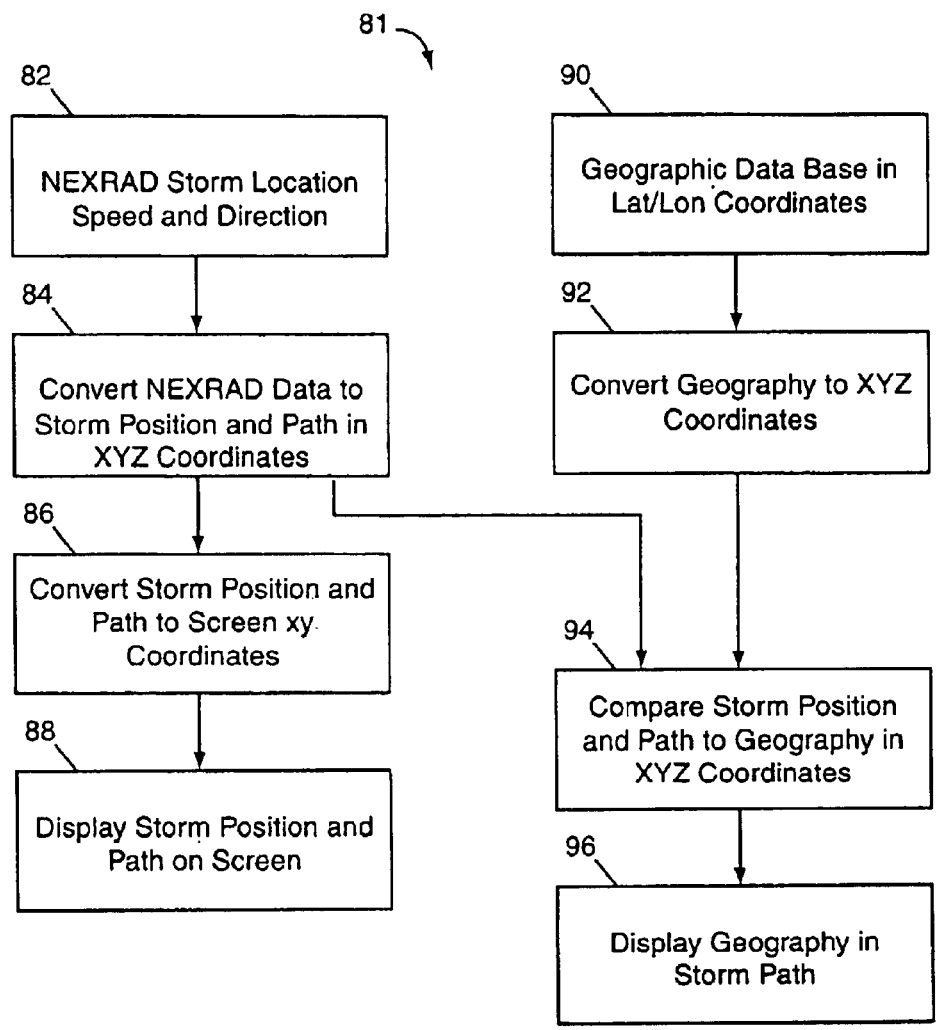
FIG. 7 is a flowchart diagram illustrating a exemplary method in accordance with the present invention for combining a storm location and predicted path in three-dimensional XYZ coordinates with geographical locations defined in XYZ coordinates to determine and display geographical locations in the storm path.

An exemplary procedure 81 for processing NEXRAD storm location and speed and direction information in a three-dimensional XYZ space coordinate system in accordance with the present invention, e.g., to determine geographic locations of interest which are in the predicted path of a storm, will now be described with reference to the flowchart diagram of FIG. 7. NEXRAD storm location, speed, and direction information, as provided by the NEXRAD radar source 26, are provided to a system 10 in accordance with the present invention for processing at step 82. As discussed above, such weather information 22 may be stored in memory 18. At step 84, the NEXRAD storm attribute information received in the previous step is converted into a three-dimensional XYZ coordinate system in accordance with the present invention. An exemplary method in accordance with the present invention for converting NEXRAD storm position attribute information (in range and azimuth) to three-dimensional XYZ coordinates is described in detail above. Having established the storm location in the three-dimensional XYZ coordinate space, a predicted path of movement of the storm in the three-dimensional XYZ coordinate space may be derived, e.g., from the speed and direction information provided in the NEXRAD attributes. For example, a storm path may be defined in the three-dimensional XYZ coordinate space as a storm cone or other three-dimensional volume defined by a series of XYZ coordinates in the three-dimensional XYZ coordinate space. At step 86 the storm position and path information generated in the three-dimensional XYZ coordinate system may be converted to screen xy coordinates for display of a graphical representation of the storm position and path on a display screen, e.g., overlaid on a map of a geographical area of interest, as part of a weather presentation at step 88. An exemplary procedure for converting three-dimensional XYZ coordinates to screen xy coordinates for display of points defined in a three-dimensional XYZ space over a geographical display without converting the three-dimensional XYZ point locations to lat/lon coordinates is described above.

To compare the storm position and path generated in the three-dimensional XYZ coordinate space at step 84 with geographic locations of interest, to determine whether such locations of interest are in the storm path, the system processor 12 may first select the locations of interest from a geographic database 24 stored in memory 18 at step 90. In most commercial geographic databases, the geographic locations therein are provided in lat/lon coordinates. At step 92, the lat/lon coordinates of geographic locations of interest are converted to the three-dimensional XYZ coordinate system. An exemplary procedure for converting lat/lon coordinates to three-dimensional XYZ coordinates in accordance with the present invention is provided above. At step 94, the storm position and path generated in three-dimensional XYZ coordinates is compared to the geographic locations of interest, also in the three-dimensional XYZ coordinate system, to determine which geographic locations are in the storm path. This may be accomplished, for example, by performing an interior test for the locations of interest, to determine if the locations of interest are within the storm cone or other volume representing the storm location and path, which may be defined as a list of points in the three-dimensional XYZ coordinate system. (In the exemplary three-dimensional XYZ coordinate system discussed herein, the Y components of the storm position and path and geographic locations of interest in the three-dimensional XYZ coordinate system may be ignored, so that a standard two-dimensional interior test can be used.) The distance of the storm location to geographic locations of interest within the storm path can be easily calculated in three-dimensional XYZ space by computing the distance separating the XYZ coordinates for the storm location and the geographic location of interest. An exemplary routine for calculating the arc distance in miles between two XYZ points (from a storm to a city in the storm's path) follows, although other similar routines also may be used:

```
double xyzArcDistance(double *xyzP0, double *xyzp1)
{
    double x, y, z; // works for distance<¼ earth cirumference
    x=(xyzP0[0]/EARTH_RADIUS)*(xyzP1[0]/EARTH_RADIUS);
    y=(xyzP0[1]/EARTH_RADIUS)*(xyzP1[1]/EARTH_RADIUS);
    z=(xyzP0[2]/EARTH_RADIUS)*(xyzP1[2]/EARTH_RADIUS);
    return a cos(x+y+z)*MILE_EARTH_RADIUS;
}
```

The speed of the storm, as provided in the NEXRAD storm attributes, may then be used to determine the expected arrival time of the storm at geographic locations of interest in the storm path. At step 96, an indication of the geographic locations, e.g., cities, in the storm path, the distance of the storm from these locations, and the expected arrival time of a storm at these locations may be displayed, e.g., as a textual or graphic display. (E.g., selected cities 42 in the storm path 40 may be highlighted on the weather display map 32.)

It is understood that the present invention is not limited to the particular exemplary applications and embodiments described in detail herein, but embraces such modified forms thereof as come within the scope of the following claims. In particular, it should be noted that the present invention is not limited to use with NEXRAD storm attribute information, or other weather information provided as a distance and direction of weather phenomena from a fixed known location. Further, the present invention is not limited to the particular programming steps or sequences thereof as presented herein.

What is claimed is:

1. A method of processing weather information, comprising:

(a) receiving a plurality of NEXRAD attributes corresponding to a storm and storing said plurality of NEXRAD attributes in memory, wherein the plurality of NEXRAD attributes include a storm displacement from a known NEXRAD radar location;

(b) deriving a storm position in XYZ coordinates in a three-dimensional coordinate space from a first selected group of the plurality of stored NEXRAD attributes by converting the known NEXRAD radar location into radar location coordinates in the three-dimensional coordinate space and deriving the storm position in the three-dimensional coordinate space from the radar location coordinates and the storm displacement;

(c) determining a projected storm path in the three-dimensional coordinate space using the derived storm position and a second selected group of the plurality of stored NEXRAD attributes; and (d) displaying a graphical representation of the projected storm path.

2. The method of claim 1 wherein the three-dimensional coordinate space is centered with the origin thereof at the center of the earth.

3. The method of claim 1 wherein the first selected group of the plurality of stored NEXRAD attributes comprises a storm distance from a known NEXRAD radar location and a storm direction from the NEXRAD radar location, and wherein the step of deriving the storm position in XYZ coordinates includes the steps of:

(a) converting the known NEXRAD radar location to an original XYZ coordinate in the three dimensional coordinate space;

(b) determining an intermediate XYZ coordinate in the three dimensional coordinate space by shifting the original XYZ coordinate along an arc by a distance related to the storm distance from the NEXRAD radar location; and (c) determining the storm position in XYZ coordinates by shifting the intermediate XYZ coordinate along an arc by an amount related to the storm direction from the NEXRAD radar location.

4. The method of claim 1 comprising additionally the step of comparing the projected storm path to selected locations identified in a location database in the three-dimensional coordinate space to determine which of the selected locations will be affected by the projected storm path.

5. The method of claim 4 wherein the selected locations identified in the location database are identified therein by latitude and longitude, and comprising additionally the step of converting the selected locations from latitude and longitude to XYZ coordinates in the three-dimensional coordinate space before comparing the projected storm path to the selected locations in the three-dimensional coordinate space.

6. The method of claim 4 comprising additionally the step of displaying the affected locations.

7. The method of claim 1 wherein the step of displaying a graphical representation of the projected storm path includes the step of converting the projected storm path from the three-dimensional coordinate space into two-dimensional screen coordinates for display of the projected storm path over a graphical map of a geographical area without converting the location of the storm or of the projected storm path from the three-dimensional coordinates to latitude and longitude coordinates.

8. The method of claim 7 wherein the step of converting the projected storm path from the three-dimensional coordinates into two dimensional screen coordinates includes the steps of performing a binary search for screen y coordinates corresponding to the projected storm path and for screen x coordinates corresponding to the projected storm path.

9. A method of processing weather information, comprising:
   (a) receiving weather information including a location of weather phenomenon from a weather information source provided as a displacement from a known location;
   (b) deriving a position of the weather phenomenon XYZ coordinates in a Three-dimensional coordinate space from the received weather information by converting the known location into location coordinates in the three-dimensional coordinate space and deriving the position of the weather phenomenon in the three-dimensional coordinate space from the location coordinates and the displacement; and
   (c) processing the weather information in the three-dimensional coordinate space.

10. The method of claim 9 wherein the three-dimensional coordinate space is centered with the origin thereof at the center of the earth.

11. The method of claim 9 wherein the weather information source is NEXRAD weather radar and wherein the weather information includes the location of a storm provided as storm attributes comprising a storm distance from a known NEXRAD radar location and a storm direction from the NEXRAD radar location.

12. The method of claim 11 wherein the step of deriving a position of the weather phenomenon in XYZ coordinates includes deriving a storm position in XYZ coordinates including the steps of:
   (a) converting the known NEXRAD radar location to an original XYZ coordinate in the three-dimensional coordinate space;
   (b) determining an intermediate XYZ coordinate in the three-dimensional space by shifting the original XYZ coordinate along an arc by a distance related to the storm distance from the NEXRAD radar location; and
   (c) determining the storm position in XYZ coordinates by shifting the intermediate XYZ coordinate along an arc by an amount related to the storm direction from the NEXRAD radar location.

13. The method of claim 9 wherein the step of processing the weather information in the three-dimensional coordinate space includes the step of determining a projected weather phenomenon path in the three-dimensional coordinate space.

14. The method of claim 13 comprising additionally the step of comparing the projected weather phenomenon path to selected locations identified in a location database in the three-dimensional coordinate space to determine which of the selected locations will be affected by the projected weather phenomenon path.

15. The method of claim 14 wherein the selected locations identified in the location database are identified therein by latitude and longitude, and comprising additionally the step of converting the selected locations from latitude and longitude to XYZ coordinates in the three-dimensional coordinate space before comparing the projected weather phenomenon path to the selected locations in the three-dimensional coordinate space.

16. The method of claim 14 comprising additionally the step of displaying the affected locations.

17. The method of claim 9 comprising additionally displaying a graphical representation of the weather phenomenon location overlaid on a geographical map display.

18. The method of claim 17 wherein the step of displaying a graphical representation of the weather phenomenon location includes the step of converting the derived position of the weather phenomenon from the three-dimensional coordinate space into two-dimensional screen coordinates for display of the weather phenomenon over a graphical map of a geographical area without converting the location of the weather phenomenon from the three dimensional coordinate space to latitude and longitude coordinates.

19. The method of claim 18 wherein the step of converting the derived position of the weather phenomenon from the three-dimensional coordinates into two-dimensional screen coordinates includes the steps of performing a binary search for screen y coordinates corresponding to the derived position of the weather phenomenon and for screen x coordinates corresponding to the derived position of the weather phenomenon.

20. A system for processing weather information, comprising:
   (a) a first database comprising a plurality of NEXRAD attributes corresponding to a storm including a storm displacement from a known NEXRAD radar location;
   (b) a processor communicating with the first database to derive a storm position in XYZ coordinates in a three-dimensional coordinate space from a first selected group of the plurality of the NEXRAD attributes by converting the known NEXRAD radar location into radar location coordinates in the three-dimensional coordinate space and deriving the storm position in the three-dimensional coordinate space from the radar location coordinates and the storm displacement and to determine a projected storm path in the three-dimensional coordinate space using the derived storm position and a second selected group of the plurality of NEXRAD attributes; and
   (c) a display device communicating with the processor to display a graphical representation of the projected storm path.

21. The system for processing weather information of claim 20 wherein the three-dimensional coordinate space is centered with the origin thereof at the center of the earth.

22. The system for processing weather information of claim 20 wherein the first selected group of the plurality of NEXRAD attributes comprises a storm distance from a known NEXRAD radar location and a storm direction from the NEXRAD radar location, and wherein the processor includes:
   (a) means for converting the known NEXRAD radar location to an original XYZ coordinate in the three dimensional coordinate space;
   (b) means for determining an intermediate XYZ coordinate in the three dimensional coordinate space by shifting the original XYZ coordinate along an arc by a distance related to the storm distance from the NEXRAD radar location; and
   c) means for determining the storm position in XYZ coordinates by shifting the intermediate XYZ coordinate along an arc by an amount related to the storm direction from the NEXRAD radar location.

23. The system for processing weather information of claim 20 comprising additionally a second database comprising selected geographic locations and wherein the processor is in communication with the second database to compare the projected storm path to the selected geographic locations identified in the second database in the three-dimensional coordinate space to determine which of the selected locations will be affected by the projected storm path.

24. The system for processing weather information of claim 23 wherein the selected locations identified in the second database are identified therein by latitude and longitude, and wherein the processor is in communication with the second database to convert the selected locations from latitude and longitude to XYZ coordinates in the three-dimensional coordinate space before comparing the projected storm path to the selected locations in the three-dimensional coordinate space.

25. The system for processing weather information of claim 23 wherein the display device is in communication with the processor to display the effected locations.

26. The system for processing weather information of claim 20 comprising additionally means for converting the projected storm path from the three-dimensional coordinate space into two-dimensional screen coordinates for display of the projected storm path over a graphical map of a geographical area without converting the location of the storm or of the projected storm path from the three-dimensional coordinates to latitude and longitude coordinates.

27. The system for processing weather information of claim 26 wherein the means for converting the projected storm path from the three-dimensional coordinates into two dimensional screen coordinates includes means for performing a binary search for screen y coordinates corresponding to the projected storm path and for screen x coordinates corresponding to the projected storm path.

28. A system for processing weather information, comprising:
   (a) a first database comprising weather information including a location of weather phenomenon received from a weather information source provided as a displacement from a known location; and
   (b) a processor communicating with the first database to derive a position of the weather phenomenon in XYZ coordinates in a three-dimensional coordinate space from the weather information by converting the known location into location coordinates in the three-dimensional coordinate space and deriving the position of the weather phenomenon in the three-dimensional coordinate space from the location coordinates and the displacement; and to process the weather information in the three-dimensional coordinate space.

29. The system for processing weather information of claim 28 wherein the three-dimensional coordinate space is centered with the origin thereof at the center of the earth.

30. The system for processing weather information of claim 28 wherein the weather information is NEXRAD weather radar information including the location of a storm provided as storm attributes comprising a storm distance from a known NEXRAD radar location and a storm direction from the NEXRAD radar location.

31. The system for processing weather information of claim 30 wherein the processor includes:

(a) means for converting the known NEXRAD radar location to an original XYZ coordinate in the three-dimensional coordinate space;
   (b) means for determining an intermediate XYZ coordinate in the three-dimensional space by shifting the original XYZ coordinate along an arc by a distance related to the storm distance from the NEXRAD radar location; and
   (c) means for determining the storm position in XYZ coordinates by shifting the intermediate XYZ coordinate along an arc by an amount related to the storm direction from the NEXRAD radar location.

32. The system for processing weather information of claim 28 wherein the processor includes means for determining a projected weather phenomenon path in the three-dimensional coordinate space.

33. The system for processing weather information of claim 32 comprising additionally a second database comprising selected geographic locations and wherein the processor is in communication with the second database to compare the projected weather phenomenon path to the selected locations identified in the second database in the three-dimensional coordinate space to determine which of the selected locations will be affected by the projected weather phenomenon path.

34. The system for processing weather information of claim 33 wherein the selected locations identified in the second database are identified therein by latitude and longitude, and wherein the processor includes means for converting the selected locations from latitude and longitude to XYZ coordinates in the three-dimensional coordinate space before comparing the projected weather phenomenon path to the selected locations in the three-dimensional coordinate space.

35. The system for processing weather information of claim 33 comprising additionally the step of displaying the affected locations.

36. The system for processing weather information of claim 28 comprising additionally a display device communicating with the processor to display a graphical representation of the weather phenomenon location overlaid on a geographical map display.

37. The system for processing weather information of claim 36 comprising additionally means for converting the derived position of the weather phenomenon from the three-dimensional coordinate space into two-dimensional screen coordinates for display of the weather phenomenon over a graphical map of a geographical area without converting the location of the weather phenomenon from the three dimensional coordinate space to latitude and longitude coordinates.

38. The system for processing weather information of claim 37 wherein the means for converting the derived position of the weather phenomenon from the three-dimensional coordinates into two-dimensional screen coordinates includes means for performing a binary search for screen y coordinates corresponding to the derived position of the weather phenomenon and for screen x coordinates corresponding to the derived position of the weather phenomenon.

* * * * *

UNITED STATES PATENT AND TRADEMARK OFFICE
CERTIFICATE OF CORRECTION

PATENT NO.    : 6,829,536 B2
DATED         : December 7, 2004
INVENTOR(S)   : John S. Moore It is certified that error appears in the above-identified patent and that said Letters Patent is hereby corrected as shown below:

Column 14,
Line 11, "cx=(xhi-xlo)/230 xlo;" should be -- cx=(xhi-xlo)/2+xlo; --.

Column 15,
Line 41, "*xyzp1" should be -- *xyzP1 --.

Signed and Sealed this

Twelfth Day of April, 2005

JON W. DUDAS
*Director of the United States Patent and Trademark Office*